United States Patent [19]

Kondo et al.

[11] Patent Number: 5,322,538
[45] Date of Patent: Jun. 21, 1994

[54] METHOD OF PROCESSING PHOTOSENSITIVE GLASS WITH SECTIONS OF DIFFERING EXPOSURE ENERGIES AND ARTICLE

[75] Inventors: Nobuhiro Kondo; Hirokazu Ono, both of Tokyo, Japan

[73] Assignee: Seikosha Co., Ltd., Tokyo, Japan

[21] Appl. No.: 975,246

[22] Filed: Nov. 12, 1992

[30] Foreign Application Priority Data

Nov. 19, 1991 [JP] Japan .................. 3-303441

[51] Int. Cl.$^5$ .................. C03B 32/00; C03C 10/00
[52] U.S. Cl. .................. 65/31; 65/33;
65/111; 501/7; 430/323; 430/330
[58] Field of Search .................. 430/323, 330; 65/33,
65/31, 30.1, 111; 501/7, 2

[56] References Cited

U.S. PATENT DOCUMENTS 3,473,927 10/1969 Loose .................. 430/323
4,057,408 11/1977 Pierson .................. 65/33
4,092,166 5/1978 Olsen .................. 430/323

FOREIGN PATENT DOCUMENTS 56-121775 9/1981 Japan .

OTHER PUBLICATIONS

"Practical Surface Technologies", No. 11, 1988, Takashi Matsurra, Photo Chemically Machinable Glass Ceramics (Japanese language copy plus English translation thereof attached hereto).
Schott Product Information No. 4844/2e, Forturan Intricate-shaped glass and glass-ceramic components.

Primary Examiner—W. Gary Jones
Assistant Examiner—John Hoffmann
Attorney, Agent, or Firm—Jordan and Hamburg

[57] ABSTRACT

A photosensitive glass processing method, and article made thereby, which makes it possible to facilitate the etch depth control, minimize the surface roughness of the etched surface, improve the operating efficiency in single-side etching process, and increase the yield includes a first exposure step, in which laser light is applied to the obverse side of photosensitive glass from above it through an exposure mask by using a pulsed laser that covers the sensitivity wavelength range of the photosensitive glass, thereby forming a first exposed portion, the energy intensity per pulse of laser light being set at 10 mJ/cm$^2$, and the total exposure energy being set at 500 mJ/cm$^2$; a second exposure step, in which laser light is applied to an end surface of the photosensitive glass through another exposure mask, thereby forming a second exposed portion, the energy intensity per pulse of laser light being set at 10 mJ/cm$^2$, and the total exposure energy being set at 15,000 mJ/cm$^2$, wherein the first exposed portion, which is crystallized by heat treatment, is easy to etch, while the second exposed portion, which is crystallized by the same heat treatment, is difficult to etch, and a groove is formed at the position of the first exposed portion.

16 Claims, 6 Drawing Sheets

METHOD OF PROCESSING PHOTOSENSITIVE GLASS WITH SECTIONS OF DIFFERING EXPOSURE ENERGIES AND ARTICLE

BACKGROUND OF THE INVENTION

1. Field of the Invention

The present invention relates to a method of processing photosensitive glass by etching.

2. Description of the Prior Art

There has heretofore been a method of processing photosensitive glass by etching to form fine shapes, for example, ink-jet printer heads. This method includes the steps of exposing a desired portion of photosensitive glass by irradiation with an ultraviolet lamp (exposure step), crystallizing the exposed portion by heating the photosensitive glass to a temperature in the range of 500° C. to 700° C. (heat development step), and removing the crystallized exposed portion by dissolving it in an etching liquid, i.e., hydrofluoric acid solution, (etching step). As the ultraviolet lamp, for example, a high-pressure mercury lamp is employed.

Meantime, there is a process where only one side of photosensitive glass is etched to form groove portions or the like. In this process, the reverse side of the photosensitive glass that is not desired to be etched is covered with etching protecting tape or the like before the etching step in order to protect it from the etching liquid, or the reverse side of the photosensitive glass is kept away from the etching liquid by using an etching jig.

In the conventional method, the control of the etch depth of groove portions or the like, which are cut in photosensitive glass by etching crystallized exposed portions formed on the photosensitive glass, is effected on the basis of etching conditions, i.e., etching time, the temperature and concentration of the etching liquid, etc. However, the etch rate of the crystallized exposed portions depends not only on such etching conditions but also on other factors, for example, exposure intensity, heat development conditions, etc. Further, the etch rate varies according to various factors such as fatigue of the etching liquid, contamination of the etching liquid with the crystallized portions of the photosensitive glass which are dissolved by etching, and the way in which the crystallized portions are exposed to the etching liquid. Therefore, the control of the etch depth has heretofore been extremely difficult.

The prior art also suffers from the problem that the etched surface of the crystallized exposed portion has a large surface roughness. In ink-jet printer head application, if the path of ink is formed by a surface having a large surface roughness, air bubbles mixed in the ink are likely to stagnate, producing an adverse effect on the ink injection characteristics. In micro-machining application, the prior art suffers from the problem that a mechanical drive part cannot move smoothly because of large friction.

Further, in the case of single-side etching, it takes time and labor to cover the photosensitive glass with protecting tape before the etching process and strip the tape thereafter. In addition, the photosensitive glass substrate may be damaged when the tape is stripped therefrom. The use of a jig for the etching process involves the problems that such an etching jig is costly, and that since force is applied to the photosensitive glass when attached to the jig, the glass is readily broken during the etching process, which invites a lowering in the yield.

SUMMARY OF THE INVENTION

It is a first object of the present invention to facilitate the control of the etch depth in processing of photosensitive glass.

It is a second object of the present invention to make it possible to minimize the surface roughness on the etched surface.

It is a third object of the present invention to eliminate the need to attach protecting tape to photosensitive glass even in the single-side etching process, thereby eliminating the cause of damage to and breakage of the photosensitive glass, and thus improving the yield.

To these ends, the present invention provides a photosensitive glass processing method including an exposure step where photosensitive glass is exposed in a predetermined pattern by exposure means, a heat development step where the exposed portion is crystallized, and an etching step where the crystallized portion is removed, thereby forming a groove corresponding to the pattern in the photosensitive glass. The exposure step includes first and second exposure steps. The first exposure step gives a first exposure energy necessary for forming a first crystallized portion which is easy to etch, and both the first and second exposure steps or only the second exposure step gives a second exposure energy that is larger than the first exposure energy and that is necessary for forming a second crystallized portion which is difficult to etch in contiguous relation to the first crystallized portion.

The exposure means is preferably a laser.

The laser is preferably a XeCl excimer laser.

If the etching step etches the first crystallized portion until the second crystallized portion is exposed, the surface roughness of the etched surface is improved effectively.

The second exposure step applies exposure light in a direction that perpendicularly intersects a direction in which exposure light is applied in the first exposure step, thereby forming the second crystallized portion in a thicknesswise middle portion of the photosensitive glass. Alternatively, the second exposure step may apply exposure light at an angle to a direction that perpendicularly intersects a direction in which exposure light is applied in the first exposure step, thereby forming the second crystallized portion, which is inclined, in a thicknesswise middle portion of the photosensitive glass.

The second exposure step may apply exposure light in a direction that perpendicularly intersects a direction in which exposure light is applied in the first exposure step, thereby forming the second crystallized portion on either of the obverse and reverse sides of the photosensitive glass. In this case, the second exposure energy is larger than the first exposure energy. This process may be effectively applied to single-side etching.

Further, the exposure step may include a third exposure step, which gives a third exposure energy that is larger than the first exposure energy and that is necessary for forming a third crystallized portion which is difficult to etch. In this case, the third exposure step applies exposure light in the same direction as that in which exposure light is applied in the first exposure step, so as to expose a portion which is not exposed in the first exposure step. This process is effective in improving the surface roughness of all the etched surfaces.

The present inventors have found that in a process where photosensitive glass is exposed by using an exposure means, preferably an excimer laser, and then subjected to heat development, if a portion of the photosensitive glass is exposed with an exposure energy which is larger than an exposure energy adequate to form a crystal that etches at a higher rate than that of the non-crystallized portion, the exposed portion becomes a crystallized portion which can hardly be etched, and that the etched surface of this crystallized portion has an extremely small surface roughness.

Experimental data that led us to the above conclusion is shown in the graph of FIG. 16. It will be understood from the graph that when exposure is carried out with a XeCl excimer laser whose energy intensity per pulse is 10 mJ/cm$^2$, a total exposure energy in the range of 100 mJ/cm$^2$ to 6,000 mJ/cm$^2$ provides an etch rate not lower than 10 82 m/min, so that a crystal which etches at a higher rate than that of the non-crystallized portion is formed; however, if the total exposure energy exceeds the above-described range, the etch rate lowers rapidly, and with a total exposure energy above 10,000 mJ/cm$^2$, a crystal which is exceedingly difficult to etch is formed.

It has been revealed from this finding that it is preferable to expose a portion, where the desired pattern is wanted to form by etching, with a total exposure energy in the range of 100 mJ/cm$^2$ to 6,000 mJ/cm$^2$ and to expose a portion, where it is desired to form a layer which is difficult to etch, with a total exposure energy above 10,000 mJ,/cm$^2$. Thereafter, heat development and etching are carried out.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS

Embodiments of the present invention will be described below with reference to the accompanying drawings.

Embodiment 1

First, a process for producing an ink-jet printer head of photosensitive glass by the processing method of the present invention will be explained in the sequence of manufacturing steps with reference to FIGS. 1 to 5.

Figure 1:
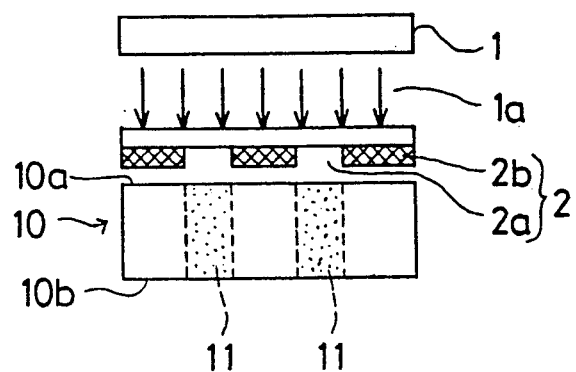
FIG. 1 is a front view showing a first exposure step in a first embodiment of the photosensitive glass processing method according to the present invention.

Referring to FIG. 1, which shows a first exposure step, both the obverse side 10a and the reverse side 10b of photosensitive glass 10 with a thickness of 1 mm are polished, and the obverse side 10a of the photosensitive glass 10 is irradiated with laser light la through an exposure mask 2 from a laser oscillator 1, which is disposed above the photosensitive glass 10. The exposure mask 2 is formed with exposure patterns 2a that define the configuration of grooves or the like which are to be formed on the surface of the photosensitive glass 10. The mask 2 further has shading portions 2b formed in the remaining part thereof.

Figure 16:
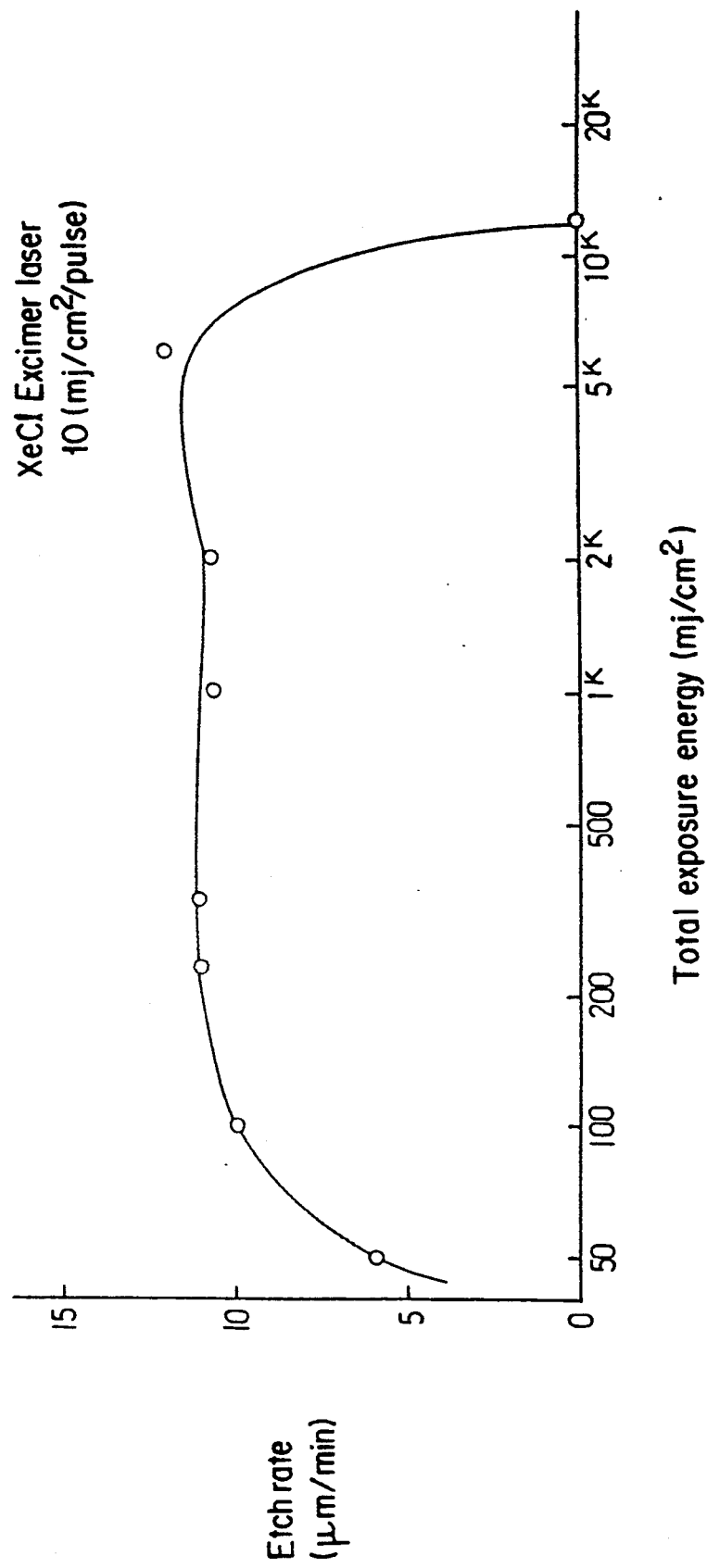
FIG. 16 is a graph showing data on the etch rate relative to the total exposure energy.

As the laser 1, a pulsed laser that covers the sensitivity wavelength range, i.e., 150 nm to 400 nm, of photosensitive glass is selected. In this example, a XeCl excimer laser having an oscillation wavelength of 308 nm was used. In this exposure, the energy intensity per pulse of XeCl excimer laser light la was set at 10 mJ/cm$^2$, and about 50 pulses of laser light were applied. That is, the total exposure energy was about 500 mJ/cm$^2$ As a result of the irradiation, exposed portions 11 corresponding to the exposure patterns 2a are formed on the obverse side 10a of the photosensitive glass 10. Since the total exposure energy is 500 mJ/cm$^2$, the exposed portions 11 are where it is possible to form first crystallized portions 11a which etch at a high rate, as shown in FIG. 16.

Figure 2:
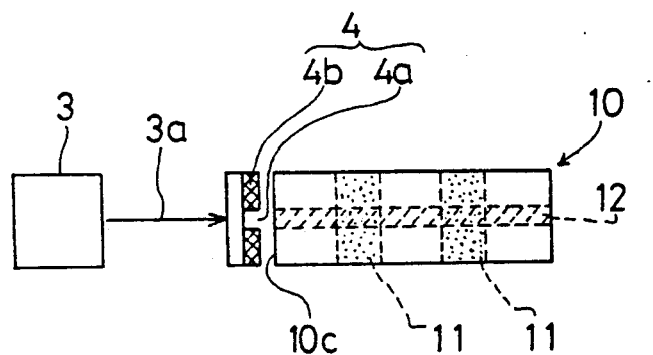
FIG. 2 is a front view showing a second exposure step in the first embodiment of the present invention.

In a second exposure step, shown in FIG. 2, another laser oscillator 3 is disposed in opposing relation to an end surface 10c of the photosensitive glass 10, and XeCl excimer laser light 3a is applied to the end surface 10c of the photosensitive glass 10 through an exposure mask 4. The exposure mask 4 is formed with an exposure pattern 4a that defines the configuration of a layer which is difficult to etch and which is formed in the thicknesswise middle portion of the photosensitive glass 10. The mask 4 further has shading portions 4b formed in the remaining part thereof. Accordingly, the exposure direction in the second exposure step perpendicularly intersects the exposure direction in the first exposure step.

In the second exposure step, the energy intensity per pulse of XeCl excimer laser light 3a was set at 10 mJ/cm$^2$, and 1,500 pulses of excimer laser light were applied. That is, the total exposure energy was 15,000 mJ/cm$^2$. As a result of the irradiation, an exposed portion 12 corresponding to the exposure pattern 4a is formed in the thicknesswise middle portion of the photosensitive glass 10. Since the total exposure energy is 15,000 mJ/cm$^2$, the exposed portion 12 is where it is possible to form a second crystallized portion 12a whose etch rate is almost 0 μm/min, that is, which is difficult to etch, as shown in FIG. 16.

Figure 3:
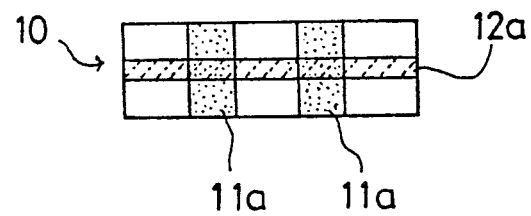
FIG. 3 is a front view of photosensitive glass after a heat development step in the first embodiment of the present invention.

In a third step, shown in FIG. 3, the photosensitive glass 10 is heated to a high temperature in the range of about 500° C. to 700° C., thereby performing heat development to crystallize the exposed portions 11 and 12, and thus forming first and second crystallized portions 11a and 12a.

Figure 4:
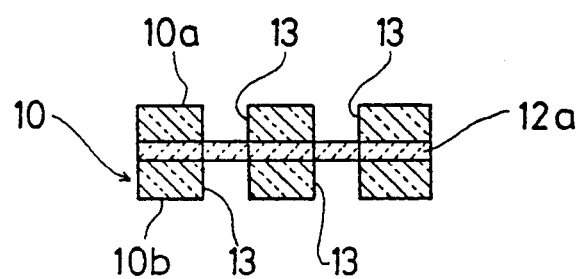
FIG. 4 is a sectional view of photosensitive glass after an etching step in the first embodiment of the present invention.

Next, in a fourth step, shown in FIG. 4, the photosensitive glass 10 is etched with an etching liquid comprising a hydrofluoric acid (HF) 6% solution at a shower pressure of 3 kg/cm$^2$. Consequently, the crystallized portions 11a are removed from both the obverse side 10a and the reverse side 10b at an etch rate of about 10 82 m/min, resulting in groove portions 13 being formed on both sides. However, the crystallized portion 12a is not etched because the etch rate of this portion is about 0 μm/min. In other words, doubleside etching is carried out in such a manner that the first crystallized portions 11a are removed until the second crystallized portion 12a is exposed. Thus, an ink-jet printer head substrate, in which the bottom of each groove portion 13 serving as a path of ink is formed by the crystallized portion 12a, is formed. Since the path of ink in an ink-jet printer head needs an etch depth of about 100 μm, etching should be carried out for a period of time a little longer than 10 minutes (e.g., 11 minutes).

In this processing method, the etch depth control is facilitated because the crystallized portion 12a is not etched even if there are variations in the etching conditions or heat development conditions. That is, by setting an etching time which is a little longer than usual, the crystallized portion 12 is exposed. Thus, a predetermined etch depth can be realized accurately and easily.

In addition, the etched surface is extremely smooth. That is, whereas the surface roughness in the prior art is 1 μm to 2 μm in terms of Rz, the surface roughness in the present invention is at least one order in magnitude smaller than the above-described level in the prior art in terms of Rz.

Figure 5:
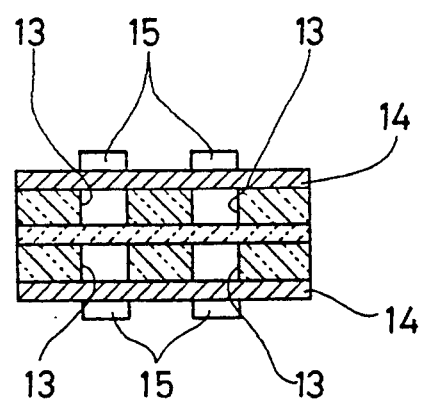
FIG. 5 is a sectional view of an ink-jet printer head that employs a photosensitive glass substrate produced by the first embodiment of the processing method according to the present invention.

FIG. 5 shows an ink-jet printer head, in which vibrating plates 14 are attached to both the obverse and reverse sides of the photosensitive glass substrate, formed as described above, and piezoelectric elements 15 are provided at predetermined positions, respectively, on the outer surfaces of the vibrating plates 14.

In the ink-jet printer head, the paths 13 of ink are filled with ink from an ink feed means (not shown). When a voltage is applied to the piezoelectric elements 15, the vibrating plates 14 are deformed inwardly, so that the ink in the paths 13 is pressed to jet out from ink outlets. Thus, printing is effected.

Embodiment 2

A second embodiment of the present invention will next be explained with reference to FIGS. 6 to 8. In a first exposure step, which is the same as that described in connection with FIG. 1, photosensitive glass 20 is formed with exposed portions 21 for forming first crystallized portions 21a, which are easy to etch.

Figure 6:
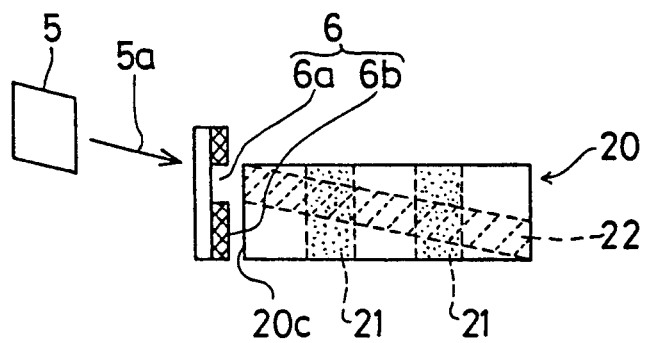
FIG. 6 is a front view showing a second exposure step in a second embodiment of the photosensitive glass processing method according to the present invention.

In a second exposure step, shown in FIG. 6, a laser oscillator 5 that emits laser light obliquely is disposed in opposing relation to an end surface 20c of the photosensitive glass 20, and XeCL excimer laser light 5a is applied to the end surface 20c of the photosensitive glass 20 through an exposure mask 6. The exposure mask 6 is formed with an exposure pattern 6a that defines the configuration of a layer which is difficult to etch and which is formed slantingly in the thicknesswise middle portion of the photosensitive glass 20. The mask 6 further has shading portions 6b formed in the remaining part thereof. Accordingly, the exposure direction in the second exposure step in this embodiment is at an angle to the direction perpendicularly intersecting the exposure direction in the first exposure step. The energy intensity per pulse of laser light 5a and the number pulses applied are the same as those in the first embodiment. Thus, with an exposure energy of 15,000 mJ/cm$^2$, an inclined exposed portion 22 is formed.

Figure 7:
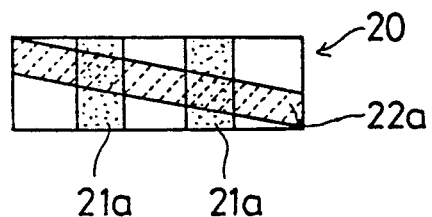
FIG. 7 is a front view of photosensitive glass after a heat development step in the second embodiment of the present invention.

In a heat development step shown in FIG. 7, which is the same as that in the first embodiment, the exposed portions 21 and 22 are crystallized to form first and second crystallized portions 21a and 22a.

Figure 8:
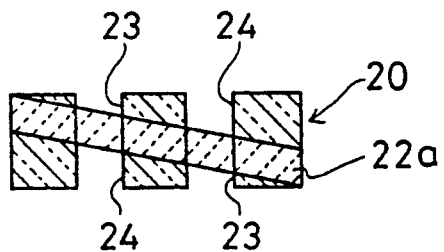
FIG. 8 is a sectional view of photosensitive glass after an etching step in the second embodiment of the present invention.

In an etching step shown in FIG. 8, which is also the same as that in the first embodiment, the crystallized portions 21a are etched from both the obverse and reverse sides. Thus, groove portions 23 and 24 are formed on both sides. At the bottom of each of the groove portions 23 and 24, the inclined surface of the second crystallized portion 22a is exposed. Thus, groove portions with inclined bottom surfaces can be formed. Although the groove portions 23 and 24 differ in the etch depth, since no etching proceeds after the second crystallized portion 22a has been exposed, these groove portions can be formed easily without strict etching conditions.

Since the angle of inclination of the second crystallized portion 22a is determined by the direction in which the laser light 5a is applied, it is possible to achieve processing with high accuracy and good reproducibility. In addition, the surface roughness of the etched surface is minimized in the same way as in the first embodiment.

Embodiment 3

Figure 9:
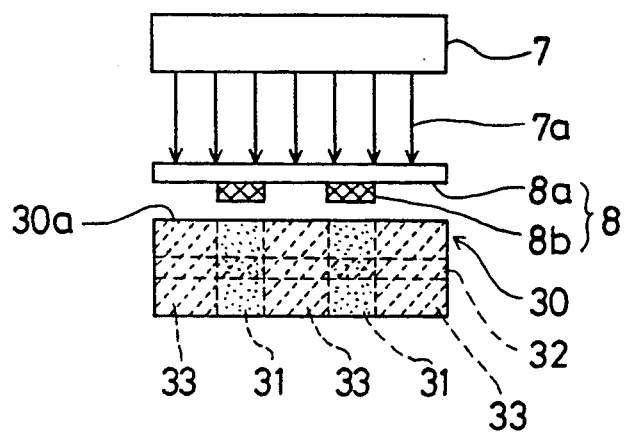
FIG. 9 is a front view showing a third exposure step in a third embodiment of the photosensitive glass processing method according to the present invention.

A third embodiment of the present invention will next be explained with reference to FIGS. 9 to 11.

In first and second exposure steps, which are the same as those explained in connection with FIGS. 1 and 2, photosensitive glass 30 is formed with exposed portions 31 for forming first crystallized portions 31a which are easy to etch, and an exposed portion 32 where it is possible to form a second crystallized portion 32a which is difficult to etch. In this embodiment, the process further includes a third exposure step, shown in FIG. 9, in which a laser oscillator 7 is disposed in opposing relation to the obverse side 30a of the photosensitive glass 30, and XeCl excimer laser light 7a is applied to the obverse 30a of the photosensitive glass 30 through an exposure mask 8. The pattern layout of the exposure mask 8 is in inverse relation to that of the exposure mask 2, which is shown in FIG. 1. That is, the exposure mask 8 has exposure patterns 8a at positions corresponding to the shading portions of the exposure mask 2, and shading portions 8b at positions corresponding to the exposure patterns of the exposure mask 2. Accordingly, in the third exposure step, the exposure direction is the same as that in the first exposure step, and exposure light is applied to portions which are not exposed in the first exposure step. The third exposure step is carried out to form third crystallized portions 33a, which are difficult to etch, at both sides of each groove. The energy intensity per pulse of laser light 7a applied is set at 10 mJ/cm$^2$, and 1,500 pulses of laser light are applied. That is, the total exposure energy is 15,000 mJ/cm$^2$. Thus, exposed portions 33 where it is possible to form third crystallized portions 33a, which are difficult to etch, are formed.

Figure 10:
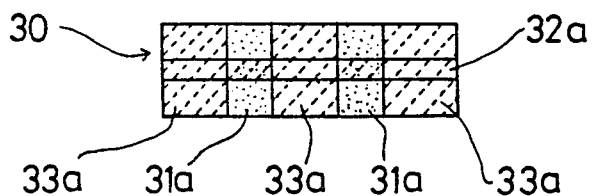
FIG. 10 is a front view of photosensitive glass after a heat development step in the third embodiment of the present invention.

In a heat development step, shown in FIG. 10, which is the same as that in the first embodiment, the exposed portions 31, 32 and 33 are crystallized to form first, second and third crystallized portions 31a, 32a and 33a.

Figure 11:
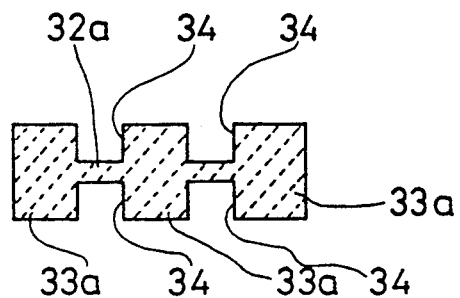
FIG. 11 is a sectional view of photosensitive glass after an etching step in the third embodiment of the present invention.

In an etching step, shown in FIG. 11, which is also the same as that in the first embodiment, the first crystallized portions 31a are etched from both the obverse and reverse sides. As a result, groove portions 34 are formed on both sides. At the bottom of each groove portion 34, the surface of the second crystallized portion 32a is exposed, and at both sides of the groove portion 34, the surfaces of the third crystallized portions 33a are exposed. Since these crystallized portions have a lower etch rate than that of the non-crystallized portions (nonexposed portions), grooves can be formed easily without strict etching conditions. Moreover, it is possible to form side surfaces of each groove which are closer to the vertical than in the case of the non-crystallized portions. Further, the surface roughness is smaller than in the case of the noncrystallized portions. Thus, smooth surfaces are obtained.

In the foregoing first to third embodiments, the total exposure energy in the second exposure step is set larger than the total exposure energy necessary for forming crystallized portions whose etch rate is higher than that of the non-crystallized portions. However, since it is only necessary to form a crystallized portion which is difficult to etch as a portion that forms the bottom of each of the grooves formed by etching, the purpose can be attained if the sum total of the total exposure energies in the first and second exposure steps exceeds the above-described total exposure energy required.

Embodiment 4

A fourth embodiment of the present invention will next be explained with reference to FIGS. 12 to 14. In this embodiment, the present invention is applied to a processing method used to etch only one side of photosensitive glass. The side of photosensitive glass that it is not desired to etch is exposed with a total exposure energy more than the total exposure energy necessary for providing crystallized portions whose etch rate is higher than that of the noncrystallized portions, thereby eliminating the need for protecting tape.

In a first exposure step, which is the same as that described in connection with FIG. 1, photosensitive glass 40 is formed with exposed portions 41 for forming first crystallized portions 41a which are easy to etch.

Figure 12:
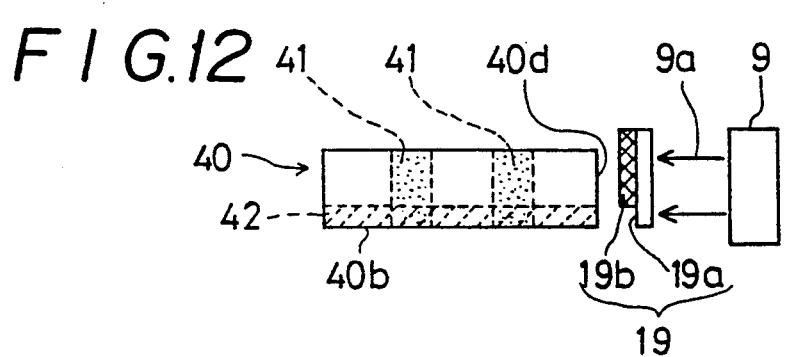
FIG. 12 is a front view showing a second exposure step in a fourth embodiment of the photosensitive glass processing method according to the present invention.

In a second exposure step, which is shown in FIG. 12, a laser oscillator 9 is disposed in opposing relation to an end surface 40d of the photosensitive glass 40, and XeCl excimer laser light 9a is applied to the end surface 40d of the photosensitive glass 40 through an exposure mask 19. The exposure mask 19 is formed with an exposure pattern 19a that defines the configuration of a layer which is difficult to etch and which is formed on the reverse side 40b of the photosensitive glass 40. The exposure mask 19 further has a shading portion 19b formed in the remaining part thereof. The energy intensity per pulse of laser light 9a is set at 10 mJ/cm$^2$, and 1,500 pulses of laser light are applied. That is, the total exposure energy is 15,000 mJ/cm$^2$. Thus, an exposed portion 42 where it is possible to form a second crystallized portion 42a, which is difficult to etch, is formed on the reverse side 40b of the photosensitive glass 40.

Figure 13:
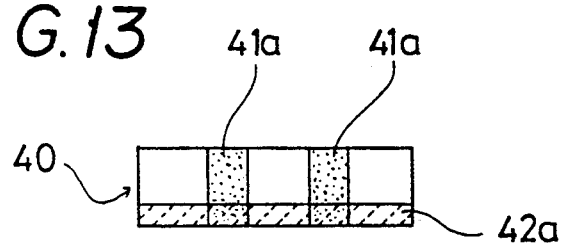
FIG. 13 is a front view of photosensitive glass after a heat development step in the fourth embodiment of the present invention.

In a heat development step, shown in FIG. 13, which is the same as that in the first embodiment, the exposed portions 41 and 42 are crystallized to form first and second crystallized portions 41a and 42a.

Figure 14:
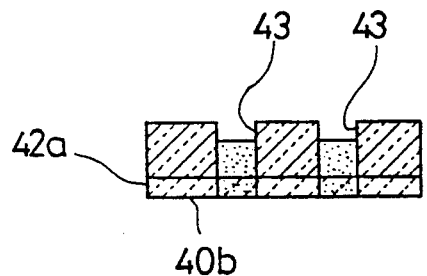
FIG. 14 is a sectional view of photosensitive glass after an etching step in the fourth embodiment of the present invention.

In an etching step, which is shown in FIG. 14, no protecting tape or the like is needed because the reverse side 40b, which it is not desired to etch, is formed with the crystallized portion 42a, which is difficult to etch. Therefore, the photosensitive glass 40 is etched as it is with an etching liquid comprising a hydrofluoric acid (HF) 6% solution at a shower pressure of 3 kg/cm$^2$ until the desired etch depth is obtained in the crystallized portions 41a, thereby forming groove portions 43. Since the path of ink in an ink-jet printer head needs an etch depth of about 100 μm, etching should be carried out for about 10 minutes.

Figure 15:
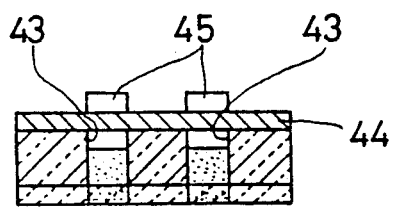
FIG. 15 is a sectional view of an ink-jet printer head that employs a photosensitive glass substrate produced by the fourth embodiment of the processing method according to the present invention.

FIG. 15 shows an ink-jet printer head, in which a vibrating plate 44 is attached to the photosentivie glass substrate, formed as described above, so as to cover the groove portions 43 serving as paths of ink, and piezoelectric elements 45 are provided at predetermined positions, respectively, on the outer surface of the vibrating plate 44.

In the ink-jet printer head, the paths 43 of ink are filled with ink from an ink feed means (not shown). When a voltage is applied to the piezoelectric elements 45, the vibrating plate 44 is deformed inwardly, so that the ink in the paths 43 is pressed to jet out from ink outlets. Thus, printing is effected.

Although in the fourth embodiment the crystallized portions formed in the first exposure step extend through the photosensitive glass in the thicknesswise direction, it should be noted that the arrangement of these crystallized portions is not necessarily limitative thereto and that the exposure energy may be controlled so that these crystallized portions are formed to a desired depth. In addition, since the second exposure step in the fourth embodiment is carried out to provide a crystallized portion which is difficult to etch on either of the obverse and reverse sides, it is necessary to give a total exposure energy more than the exposure energy necessary for forming the crystallized portions which are easy to etch. Although in the foregoing embodiments a XeCl excimer laser is employed as an exposure means, it is also possible to employ other lasers, for example, XeF (oscillation wavelength: 351 nm), KrF (oscillation wavelength: 248 nm) and ArF (oscillation wavelength: 193 nm) excimer lasers, and a N$_2$ laser (oscillation length: 337 nm). Further, it is possible to employ laser light that is obtained by converting light, which is oscillated at the fundamental oscillation wavelength of a Nd$^+$-YAG (yttrium aluminum garnet) laser, a dye laser, a Kr ion laser, an Ar ion laser or a coppervapor laser, into light in the ultraviolet region by using a nonlinear optical element. In addition, the exposure means is not necessarily limited to laser light, but it may be ultraviolet rays obtained from an excimer lamp or an extrahigh pressure mercury lamp.

Thus, according to the present invention, the first and second exposure steps are each carried out by properly selecting a total exposure energy, thereby forming a first crystallized portion which is easy to etch and a second crystallized portion which is difficult to etch, and then etching is effected until the second crystallized portion is exposed. Thus, the control of the etch depth is facilitated. Since the etched surface of the second crystallized portion is smoother than that of the non-crystallized portion, the surface roughness can be minimized, which is extremely advantageous when a groove portion thus formed is used as a path of ink. In the single-side etching process also, provision of the second crystallized portion eliminates the need to attach protecting tape or the like and hence eliminates the cause of damage to and breakage of the photosensitive glass. Thus, the yield can be improved.

If a pulsed laser that covers the sensitivity wavelength range of the photosensitive glass is employed as an exposure means, it is easy to control the total exposure energy applied.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A photosensitive glass processing method including an exposure step wherein photosensitive glass is exposed with light by an exposure means on a predetermined pattern to form an exposure portion corresponding to said pattern, a heat development step where the exposed portion is crystallized, and an etching step where a part of the crystallized portion is removed, thereby forming a groove in said photosensitive glass corresponding to said removed portion, said exposure step including first and second exposure steps in which said first exposure step comprises irradiating with a first total energy density necessary for forming a first crystallized portion and said second exposure step comprises irradiating with a second total energy density that is larger than said first total energy density for forming a second crystallized portion which is more difficult to etch than said first crystallized portion.

2. A photosensitive glass processing method according to claim 1, wherein said exposure means is a laser.

3. A photosensitive glass processing method according to claim 2, wherein said laser is a XeCl excimer laser.

4. A photosensitive glass processing method according to any one of claims 1 to 3, wherein said second crystallized portion has a boundary which intersects said first crystallized portion and said etching step etches said first crystallized portion up to said boundary.

5. A photosensitive glass processing method according to any one of claims 1 to 3, wherein said second exposure step comprises applying exposure light in a direction that perpendicularly intersects the direction in which exposure light is applied in said first exposure step.

6. A photosensitive glass processing method according to any one of claims 1 to 3, wherein said second exposure step comprises applying exposure light in a direction which is at an acute angle relative to the direction in which exposure light is applied in said first exposure step.

7. A photosensitive glass processing method according to any one of claims 1 to 3, wherein said photosensitive glass comprises a glass article having an obverse and a reverse side, and first exposure step comprises applying exposure light in a direction that passes through one of said sides, said second exposure step comprising applying exposure light in a direction that perpendicularly intersects the direction in which exposure light is applied in said first exposure step, said second exposure step forming said second crystallized portion on to one of said sides of said photosensitive glass.

8. A photosensitive glass processing method according to any one of claims 1 to 3, wherein said exposure step includes a third step which comprises irradiating with a third total exposure energy density that is larger than said first total energy density and which forms a third crystallized portion, said third exposure step applying exposure light in the same direction as that in which exposure light is applied in said first exposure step so as to expose a section which was not exposed in said first exposure step.

9. A photosensitive glass article made by the process of claim 1.

10. A method of processing photosensitive glass, comprising the steps of:
 a) exposing the photosensitive glass in a predetermined pattern by exposure means to form exposed portions, said step of exposing including the steps of:
  i) exposing a first exposed portion of said photosensitive glass with a first total energy density to form a first crystallized portion, and
  ii) exposing a second exposed portion of said photosensitive glass with a second total energy density to form a second crystallized portion which is contiguous to said first crystallized portion, said first total energy density being less than said second total energy density so that said first crystallized portion is easier to etch than said second crystallized portion;
 b) heating said photosensitive glass so as to form first and second crystallized portions corresponding respectively to said first and second exposed portions; and
 c) etching said photosensitive glass to remove said first crystallized portion, thereby forming a groove in said photosensitive glass corresponding to said removed first crystallized portion.

11. A method according to claim 10, wherein said step of etching includes the step of etching said first crystallized portion to a position in which said first crystallized portion is contiguous with said second crystallized portion.

12. A method according to claim 10, wherein said photosensitive glass comprises a glass article having an obverse and a reverse side, said step of exposing said first exposure position includes the step of applying exposure light in a first direction and said step of exposing said second exposed portion includes the step of applying exposure light in a direction that perpendicularly intersects said first direction so as to form said second crystallized portion in a middle portion of said photosensitive glass between said obverse sand reverse sides.

13. A method according to claim 10, wherein said photosensitive glass comprises a glass article having an obverse and a reverse side, said step of exposing said first exposure position includes the step of applying exposure light in a first direction and said step of exposing said second exposure portion includes the step of applying exposure light in a direction that intersects said first direction at an acute angle so as to form said second crystallized portion at an incline in a middle portion of said photosensitive glass between said obverse and reverse sides.

14. A method according to claim 10, wherein said photosensitive glass comprises a glass article having an obverse and a reverse side, said step of exposing said first exposed portion includes the step of applying exposure light in a first direction and said step of exposing said second exposed portion includes the step of applying exposure light in a direction that perpendicularly intersects said first direction so as to form said second crystallized portion contiguous with to one of said sides of said photosensitive glass.

15. A method according to claim 10, wherein said exposure step further includes the step of exposing a third exposure portion of said photosensitive glass with a third total energy density that is larger than said first total energy density to form a third crystallized portion which is more difficult to etch than said first crystallized portion, and said step of exposing said third exposure portion includes the step of applying exposure light so as to expose a section of said photosensitive glass which was not exposed in said step of exposing said first exposure portion.

16. A photosensitive glass article made by the process of claim 10.

* * * * *